(12) United States Patent
Watson

(10) Patent No.: US 12,370,967 B2
(45) Date of Patent: Jul. 29, 2025

(54) 5TH WHEEL TOWING ATTACHMENT

(71) Applicant: Charles Watson, Warren, OH (US)

(72) Inventor: Charles Watson, Warren, OH (US)

( * ) Notice: Subject to any disclaimer, the term of this patent is extended or adjusted under 35 U.S.C. 154(b) by 1078 days.

(21) Appl. No.: 17/307,038

(22) Filed: May 4, 2021

(65) Prior Publication Data
US 2021/0347419 A1 Nov. 11, 2021

Related U.S. Application Data

(60) Provisional application No. 63/020,690, filed on May 6, 2020.

(51) Int. Cl.
| | |
|---|---|
| B60R 19/48 | (2006.01) |
| B60P 3/12 | (2006.01) |
| B60Q 1/30 | (2006.01) |
| B60Q 1/34 | (2006.01) |
| B60Q 1/44 | (2006.01) |
| B60R 11/06 | (2006.01) |
| B60R 19/50 | (2006.01) |
| B62D 53/08 | (2006.01) |

(52) U.S. Cl.
CPC .............. *B60R 19/48* (2013.01); *B60P 3/125* (2013.01); *B60Q 1/34* (2013.01); *B60Q 1/44* (2013.01); *B60R 11/06* (2013.01); *B62D 53/0821* (2013.01); *B62D 53/0828* (2013.01); *B60Q 1/305* (2013.01); *B60R 2019/505* (2013.01)

(58) Field of Classification Search
CPC .. B60P 3/125; B62D 53/0821; B62D 53/0828
See application file for complete search history.

(56) References Cited

U.S. PATENT DOCUMENTS

| | | | | |
|---|---|---|---|---|
| 2,515,833 A | * | 7/1950 | Mueller | B60P 3/125 |
| | | | | 254/327 |
| 3,269,750 A | * | 8/1966 | Tantlinger | B62D 53/0864 |
| | | | | 188/3 R |
| 4,047,733 A | * | 9/1977 | Parkes | B62D 53/065 |
| | | | | 280/402 |
| 4,555,214 A | * | 11/1985 | Morton | B60P 3/125 |
| | | | | 280/402 |
| 4,708,358 A | * | 11/1987 | Gehman | B62D 53/0828 |
| | | | | 280/402 |
| 4,842,472 A | * | 6/1989 | Plant | B60P 3/125 |
| | | | | 280/402 |
| 5,249,911 A | * | 10/1993 | Marola | B62D 53/0828 |
| | | | | 280/402 |
| 5,722,677 A | * | 3/1998 | Lichter | B60P 3/125 |
| | | | | 280/407.1 |
| 5,863,059 A | * | 1/1999 | Waggoner | B60P 3/125 |
| | | | | 280/493 |
| 10,308,087 B1 | * | 6/2019 | Frosch | B60D 1/66 |

* cited by examiner

*Primary Examiner* — Kevin Hurley
*Assistant Examiner* — Hosam Shabara
(74) *Attorney, Agent, or Firm* — Brennan, Manna & Diamond, LLC

(57) ABSTRACT

The present invention relates generally to a novel fifth-wheel towing apparatus. More specifically, the invention relates to a fifth-wheel towing apparatus that allows a single individual to more easily tow a semi-truck with another semi-truck by utilizing the fifth wheel attachment points of both trucks. The fifth-wheel towing apparatus is also a cost-effective device that can be easily operated, attached/detached, and stored by a single individual.

12 Claims, 7 Drawing Sheets

5TH WHEEL TOWING ATTACHMENT

CROSS-REFERENCE TO RELATED APPLICATION

The present application claims priority to, and the benefit of, U.S. Provisional Application No. 63/020,690, which was filed on May 6, 2020 and is incorporated herein by reference in its entirety.

FIELD OF THE INVENTION

The present invention relates to a novel fifth-wheel towing apparatus. More specifically, the invention relates to a fifth-wheel towing apparatus that allows a single individual to more easily tow a semi-truck with another semi-truck by utilizing the fifth wheel attachment points of both trucks. The fifth-wheel towing apparatus is also both cost-effective and highly efficient inasmuch as it can be easily operated, attached/detached and stored by a single individual. Accordingly, the present specification makes specific reference thereto. However, it is to be appreciated that aspects of the present invention are also equally amenable to other like applications, devices and methods of manufacture.

BACKGROUND OF THE INVENTION

For individuals that own and/or operate one or more semi-trucks, dealing with unexpected breakdowns of said semi-trucks is simply inevitable. When a semi-truck breaks down, the most common course of action to retrieve/recover the semi-truck is to hire the services of a commercial wrecking/towing company. This retrieval and/or recovery process may be extremely costly, as fees typically depend upon the total distance that the semi-truck must be towed, the time of day that it will be towed and other operational related towing fees which are controlled by the towing company.

In order to attempt to circumvent the hiring of a wrecking/towing company, towing devices exist in the art that allow a user to utilize one of their own semi-trucks in conjunction with the towing device to tow the disabled semi-truck via a towing attachment that attaches to the 5th wheel trailer attachment that all semi-trucks possess. Said towing devices typically function by suspending the driven axles of the towed semi-truck above the road surface during towing. The towed semi-truck is then able to be transported in a fashion that is similar to any other trailer. As stated prior, although this action would primarily be used to recover a disabled semi-truck, existing towing devices can also be used to transport operational vehicles.

While said existing towing devices succeed in allowing a user to circumvent the hiring of a wrecking/towing company to recover a disabled semi-truck, such devices contain a plurality of fundamental limitations and inefficiencies. For example, the process in which existing 5th wheel towing devices are attached to a semi-truck is both physically demanding and extremely time consuming. For example, the process may take up to or over an hour, and typically requires several individuals (or a whole team of individuals) to aid in the positioning/attachment of the towing device onto the semi-truck. This is due to a number of factors, but most notably the overall weight and size of existing towing devices.

Furthermore, in order to transport the towing device out of its storage location and onto the semi-truck, a crane or forklift is typically required, as existing towing devices are extremely heavy and are not capable of being picked up by a single individual or even a multitude of individuals. In this respect, a user may find it desirable to simply leave the towing device attached to the semi-truck at all times to avoid having to undergo the involved attachment/detachment process. This however is extremely undesirable for other reasons, as it limits the functional capabilities of one semi-truck to only towing and recovery. While this may be acceptable for some users who have a plurality of semi-trucks at their disposal, to an individual who does not possess a plurality of semi-trucks and/or requires that all of the semi-trucks in their possession be used to transport trailers, this is not an acceptable solution. Additionally, leaving an extremely heavy towing device attached to the semi-truck at all times adds unnecessary weight to the semi-truck, thereby increasing the wear and tear on the semi-truck, as well as significantly reducing the vehicle's fuel mileage.

Therefore, there exists a long felt need in the art for an improved 5th wheel trailer attachment that allows a single user to easily operate and position the attachment device onto a semi-truck to allow for the towing of another semi-truck, thereby allowing the user to avoid having to hire a towing/wrecking company, which can be expensive. There also exists in the art a long felt need for a 5th wheel trailer attachment that can quickly and easily be transferred from a stored position to an attached position without requiring a substantial amount of physical labor or additional users to do so. Moreover, there exists a long felt need in the art for an improved 5th wheel trailer attachment that is comprised of a safety means to help mitigate potentially fatal consequences that occur if the semi-truck is rear-ended by another vehicle. Finally, there exists a long felt need in the art for an improved 5th wheel trailer attachment that is relatively inexpensive to manufacture and that is both safe and easy to use.

The present invention, in one exemplary embodiment, discloses a 5th wheel trailer attachment. The attachment is comprised of a central frame arm, a saddle assembly, an electric and/or air-brake powered motor, a toolbox and a pivoting rear bumper assembly. The saddle assembly is further comprised of a plurality of hydraulic arms and can travel along the frame arm via a hydraulic cylinder. After attaching the first end of the device to the first semi-truck via the integrated 5th wheel attachment, the saddle assembly can be positioned on the frame of the first semi-truck to support the device until the same is attached to a second semi-truck. The saddle assembly can then be repositioned and attached to the second semi-truck in order to raise the wheels of the second semi-truck off of the ground. The device is secured via the 5th wheel attachment and the second semi can be lifted off the ground for subsequent transport. Additionally, the device can be comprised of a plurality of legs that allow the device to be stored in a position that is conducive to easy attachment/detachment to/from a semi-truck.

In this manner, the 5th wheel towing attachment of the present invention accomplishes all of the forgoing objectives, thereby providing a user with the ability to quickly attach a 5th wheel towing device to a semi-truck, without substantial physical exertion or a variety of other users and/or equipment, for the purpose of towing a second semi-truck. Additionally, the 5th wheel towing apparatus of the present invention also accomplishes the additional objective of improving the safety of other motorists by utilizing a pivoting rear bumper assembly that can be stowed when not in use.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises an improved 5th wheel trailer attachment for a semi-truck. More specifically, the trailer attachment is comprised of a central frame arm, a saddle assembly, an electric/airbrake powered motor, a toolbox and a pivoting rear bumper assembly. Nonetheless, the motor may also be powered by a 12V battery or alternative power supply, and the saddle assembly may further comprise a plurality of hydraulic arms that can also be powered by the motor. The motor allows the saddle assembly to engage the frame of one or more semi-trucks during a towing operation via a plurality of channels on the bottom surface of the saddle assembly to shift the weight of the attachment to the frame of the semi(s).

In an alternative embodiment, the motor can be controlled by an integrated control panel, or wirelessly through a wireless remote/mobile application. The trailer attachment may further comprise a plurality of legs, wherein said plurality of legs allows a user to leave the attachment device in a raised position while stored, thereby allowing a user to simply back up a semi-truck onto the device for easy attachment via the 5th wheel attachment located under the 1st end of the central frame arm. The legs can further be manually set at specific heights via a pin or may be raised/lowered via a hydraulic arm system that may be located in the cab of the towing semi-truck or on an external portion of the attachment for convenient access.

More specifically, the saddle assembly rests on the central frame arm and can be moved/repositioned by a user using a plurality of integrated rollers. Accordingly, once the towing attachment device is attached to a first semi-truck the legs can be removed, thereby allowing the weight of the device to be fully supported by the saddle assembly, which engages the semi frame when the hydraulic arms of the saddle assembly are extended against the frame via a plurality of channels on the bottom surface of the saddle assembly base. Once the second semi-truck is in position, the hydraulic arms can then be retracted, thereby allowing the user to move the saddle assembly along the central frame arm via the rollers.

In an alternative embodiment of the present invention, the saddle assembly may be repositioned along the central frame arm via a hydraulic system that is powered via the 12V battery motor or an airline powering means. Once near the second end of the frame, the rear bumper assembly can also be pivoted upward and out of the way, thereby allowing the saddle assembly to engage the 5th wheel attachment point of the second semi-truck with the integrated 5th wheel mount. Once in position, the saddle assembly can be lowered onto the second semi-truck frame via the hydraulic arms. Once secured, the hydraulic arms can then be retracted, thereby allowing a portion of the second semi-truck to be suspended above the ground surface for towing.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION

Figure 1:
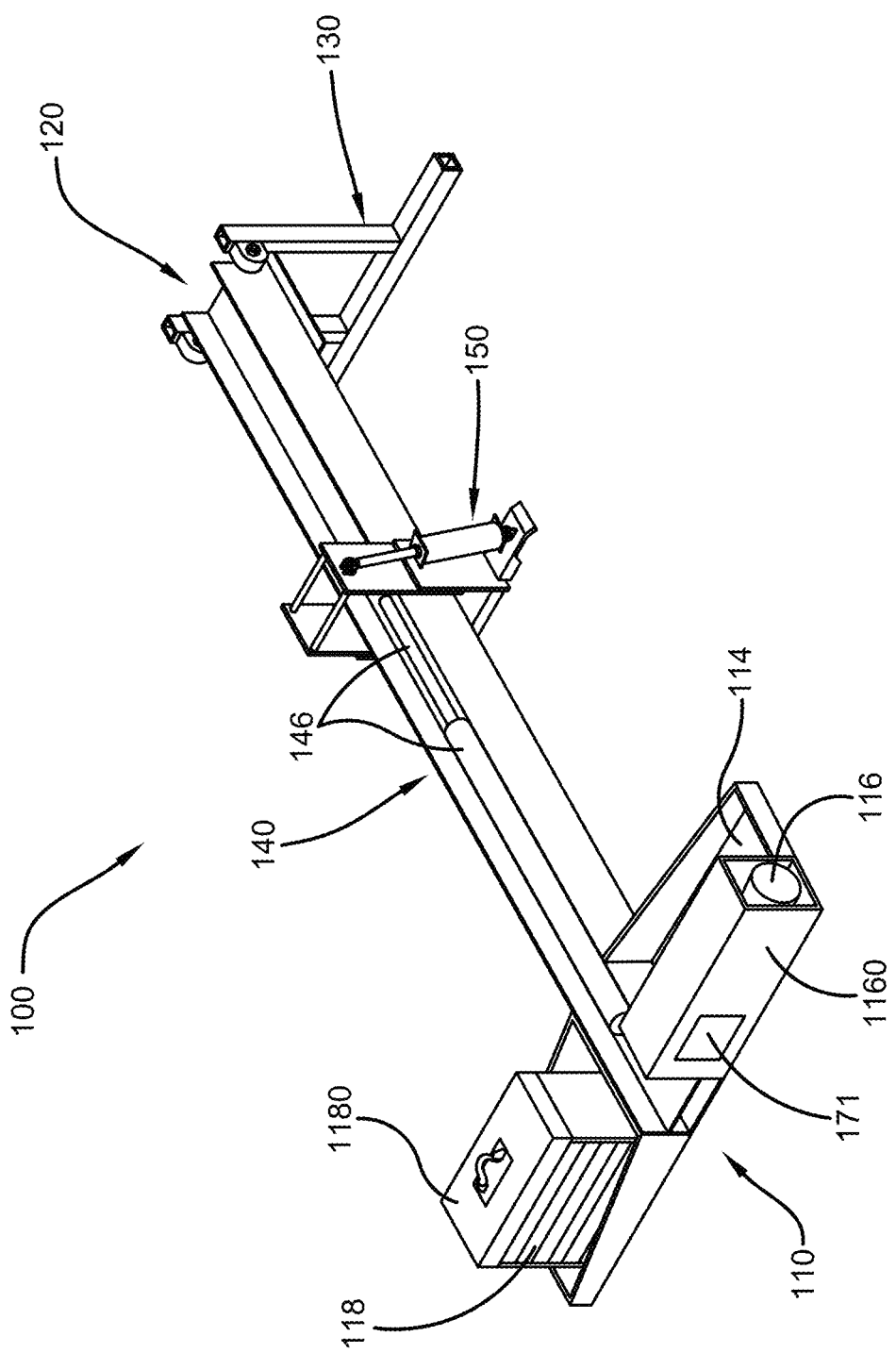
FIG. 1 illustrates a top perspective view of one possible embodiment of the 5th wheel towing attachment of the present invention in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there is a long felt need in the art for a 5th wheel trailer attachment that allows a single individual to easily operate and position the attachment device onto a semi-truck to allow for the towing of another semi-truck without having to hire a towing/wrecking company, which can be expensive, or obtain assistance from other. There also exists in the art a long felt need for a 5th wheel trailer attachment that can quickly and easily be transferred from a stored position to an attached position without requiring a substantial amount of physical labor or additional users to do so. Moreover, there exists a long felt need in the art for an improved 5th wheel trailer attachment that is comprised of a safety means to help mitigate potentially fatal consequences that occur if the semi-truck is rear ended by another vehicle. Finally, there exists a long felt need in the art for an improved 5th wheel trailer attachment that is relatively inexpensive to manufacture and that is both safe and easy to use.

Referring initially to the drawings, FIG. 1 illustrates a top perspective view of one possible embodiment of the 5th wheel towing attachment 100 of the present invention. The 5th wheel towing attachment 100 is comprised of a first end 110, a second end 120, and a central frame arm 140, which is preferably made of a structural steel w-section/I-beam. Nonetheless, in differing embodiments of the attachment device 100, the central frame arm 140, first end 110 and second end 120 may be made from other metals such as, but not limited to, stainless steel, steel, aluminum, cast iron, etc., wherein the frame arm 140 may be an integral unit or comprised of multiple units joined together via welds, fasteners, or other suitable attachment means.

Figure 2:
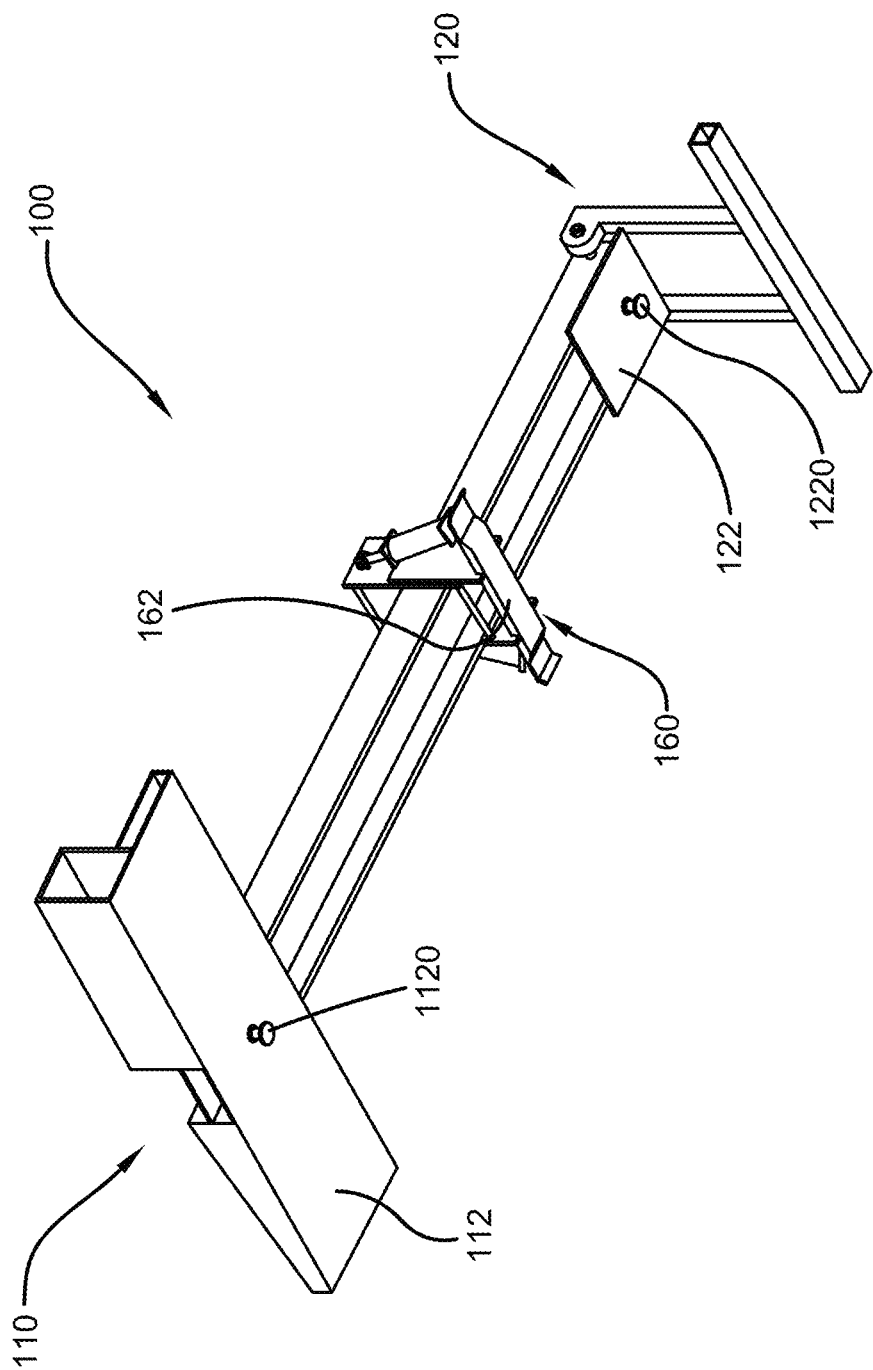
FIG. 2 illustrates a bottom perspective view of the 5th wheel towing attachment of FIG. 1 in accordance with the disclosed architecture.

As best shown in FIGS. 1 and 2, the bottom surface 112 of the first end 110 is comprised of a male 5th wheel attachment 1120. As such, the male 5th wheel attachment 1120 allows a user (not shown) to secure the first end 110 of the towing attachment 100 to a first semi-truck 10 via the semi-truck's existing 5th wheel attachment 12 for transport/recovery of a second semi-truck 20, as explained more fully below.

The first end 110 may also comprise a toolbox/tool tray 118 that allows a user to easily store any tools such as, but not limited to, chains, wrenches, sockets, screwdrivers, etc. that may be needed to repair the towing attachment device 100 and/or the towing or towed semi-truck, or to attach the towing attachment 100 to the towed semi-truck 20. In differing embodiments of the attachment device 100, the toolbox 130 may be additionally comprised of a locking lid 1180 and enclosed system, or an open-air tool tray that may further be comprised of a magnetic base for magnetic attachment to the device 100. The toolbox 118 may also be comprised of a locking mechanism that allows a user to only unlock the contents of the box 118 from within the cab of a semi-truck to prevent theft of the contents of the box 118.

The first end 110 may also be comprised of a motor housing 1160 for housing a 12v electric motor or air powered motor 116 that may be used to power the hydraulics 156/185 of the towing attachment device 100. The motor housing 1160 may completely enclose or partially enclose the motor 116, thereby allowing a user to gain access to said motor 116 and also protect the motor from inclement weather and debris while the towing attachment 100 is in motion or being stored. The motor 116 can further be controlled by an integrated control panel and/or wirelessly through a wireless remote/mobile application.

As previously stated, the towing attachment 100 further comprises a saddle assembly 150 that rests on, and is repositionable along, the central frame arm 140. The saddle assembly 150 is comprised of a plurality of generally parallel cross member supports 152, a plurality of generally parallel side walls 154, a plurality of hydraulic arms 156 that attach to the side walls 154 via a plurality of movable hinge points 157, a saddle base 160 and preferably two saddle base channels 164 located on the bottom 162 of the saddle assembly 150. Nonetheless, in differing embodiments of the towing attachment 100, the saddle assembly 150 may also be transferred from one end of the central frame arm 140 by a user via the motor 116, a series of rollers 158 that ride along the top edge 142 or inside 144 of the central frame arm 140 or a hydraulic arm system 146 that may be powered by the electric motor 116 or by the existing airbrake/airline system of the semi-truck 10.

Figure 3:
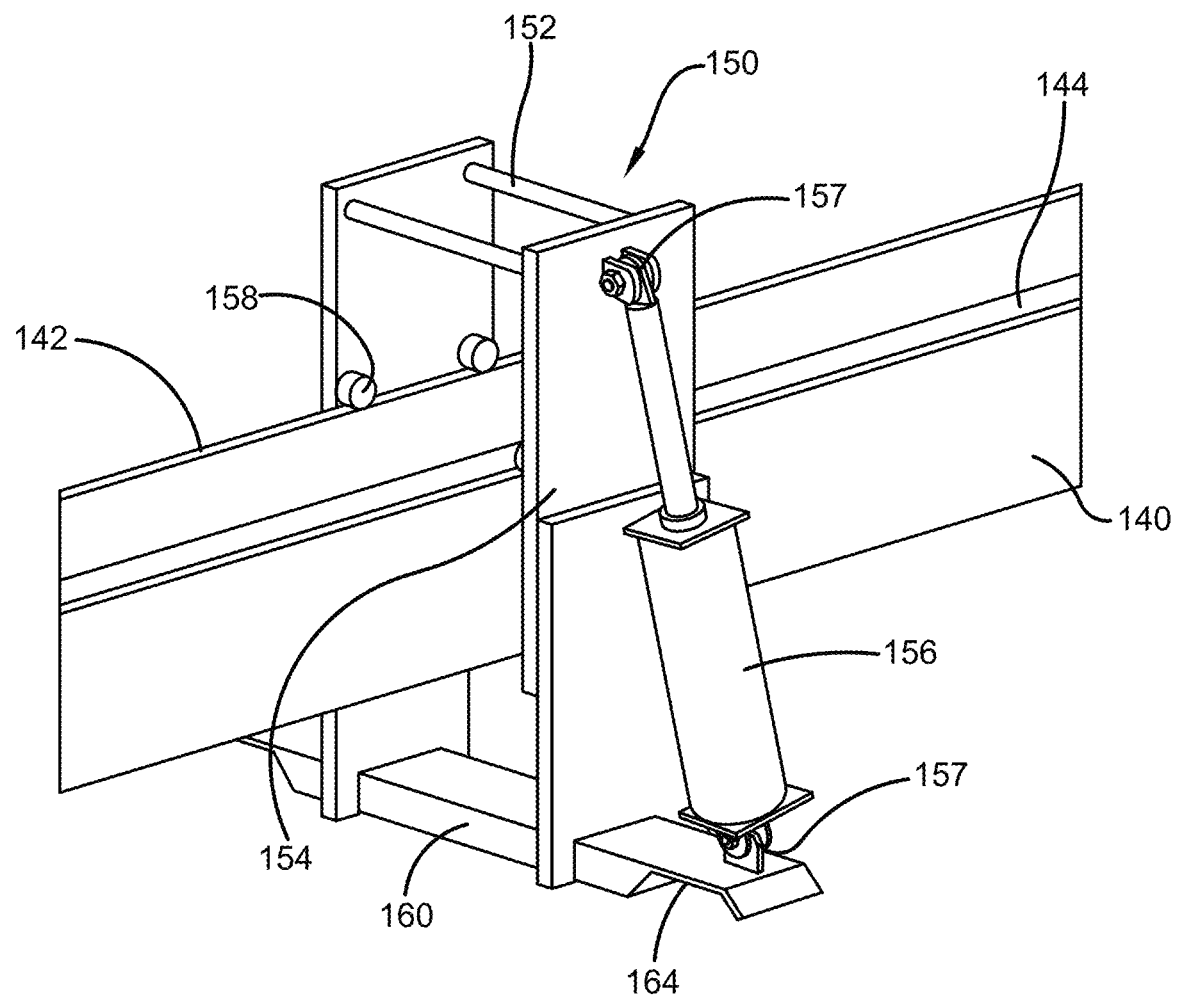
FIG. 3 illustrates a side perspective and close-up view of one potential embodiment of the saddle assembly of the 5th wheel towing attachment of FIG. 1 in accordance with the disclosed architecture.
Figure 6A:
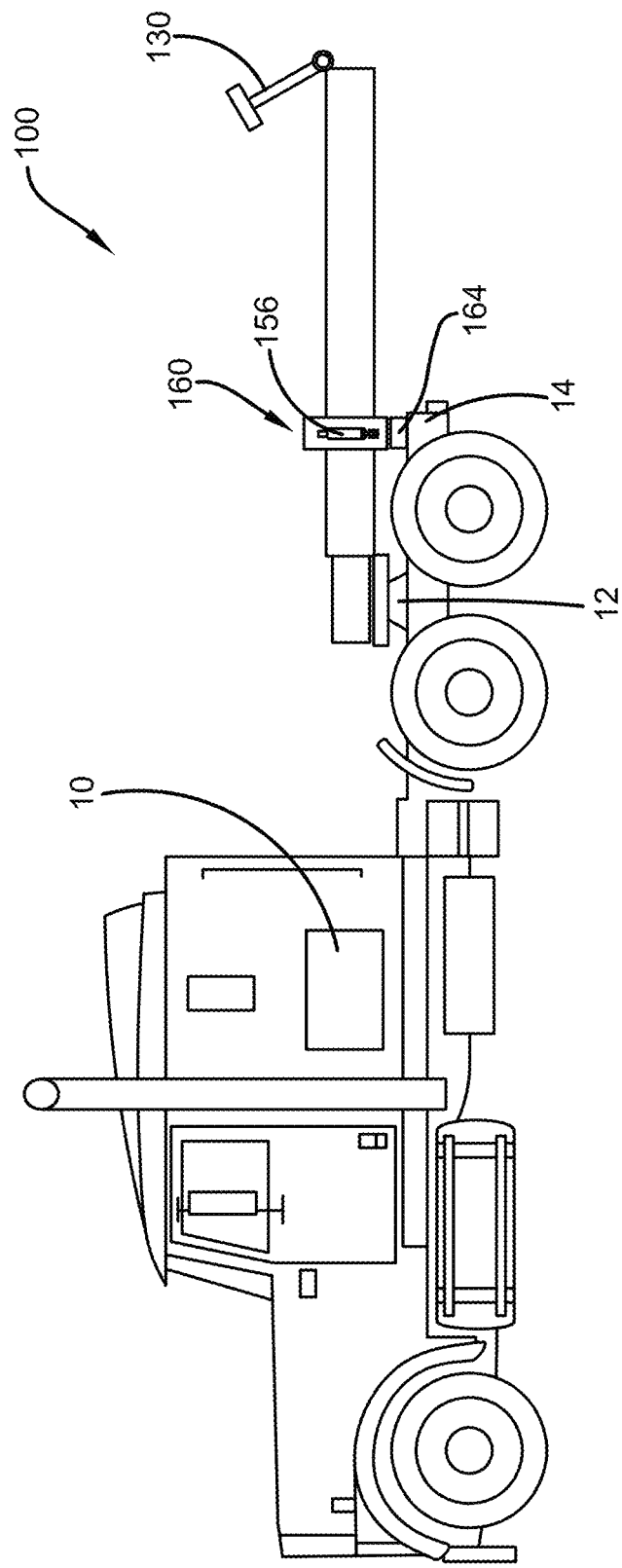
FIG. 6A illustrates a side perspective view of an alternative embodiment of the 5th wheel towing attachment of the present invention attached to a semi-truck in accordance with the disclosed architecture.

The plurality of cross member supports 152 and generally parallel side walls 154 of saddle assembly 150 provide stability and structural support to both sides of the saddle assembly 150 on the left and right sides of the central frame arm 140 and can best be observed in FIG. 3. Additionally, the saddle base 160 allows the saddle assembly 150 to make contact with the frame 14/24 of each semi-truck 10/20 in two separate instances. More specifically, the first instance involves the attachment of the towing attachment device 100 to a first semi-truck 10 from a stored/unused position, as shown in FIG. 6A. In this instance, the towing attachment device 100 is attached to the first semi-truck 10 by attaching the male 5th wheel attachment 1120 of the first end 110 to the female 5th wheel attachment 12 of the first semi-truck 10. Once this has occurred, the saddle base 160 can be extended downwards via the hydraulic cylinders 156 towards the frame 14 of the first semi-truck 10 until contact is made on both the left and right sides of the semi-truck 10 frame 14 via the saddle base channels 164. Once in contact with the semi-truck frame 14, both hydraulic arms 156 can continue to be extended against the semi-truck 10 frame 14 until the load of the towing attachment device 100 has been transferred onto the frame 14 of the semi-truck 10, thereby allowing the towing attachment device 100 to be safely transported and eliminating the possibility of the device 100 shearing from the 5th wheel attachment 12 of the semi-truck 10 at the 5th wheel attachment 1120.

Figure 6B:
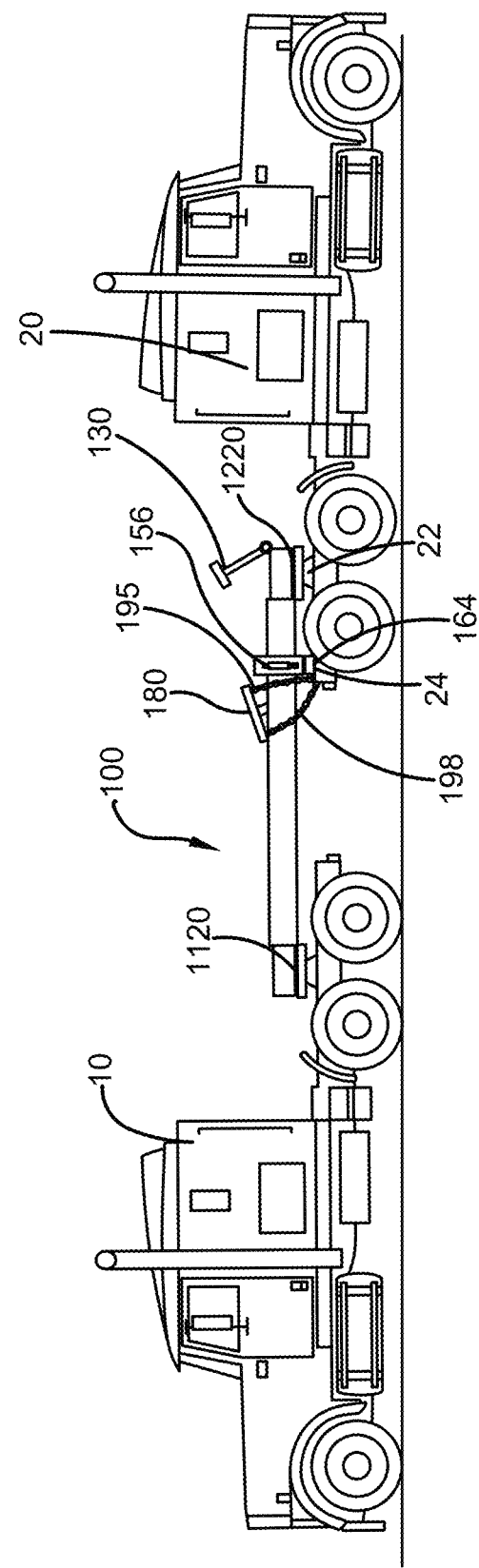
FIG. 6B illustrates a side perspective view of an alternative embodiment of the 5th wheel towing attachment of the present invention attached to two semi-trucks in accordance with the disclosed architecture.

The second instance involves a user connecting the towing attachment device 100 to a second semi-truck 20 after it has already been attached to the first semi-truck 10, as shown in FIG. 6B. To initiate this engagement, the saddle assembly 150 is slid along the central frame arm 140 from the first end 110 to the second end 120 via one of the repositioning means described supra. Then, the saddle base 160 is lowered via the hydraulic arms 156 towards the frame 24 of the second semi-truck 20. Once in contact with the frame 24 of the second semi-truck 20 via the saddle base channels 164, the base 160 of the saddle assembly may be attached to the frame 24 of the second semi-truck 20 using chains 198 or other devices that may also be attached to the towing chain support 180. Then, the hydraulic arms 156 can be retracted upwards, thereby suspending the rear axle(s) of the second semi-truck 20 into the air, and thus allowing for towing of the second semi-truck 20 to occur via the first semi-truck 10.

Figure 5:
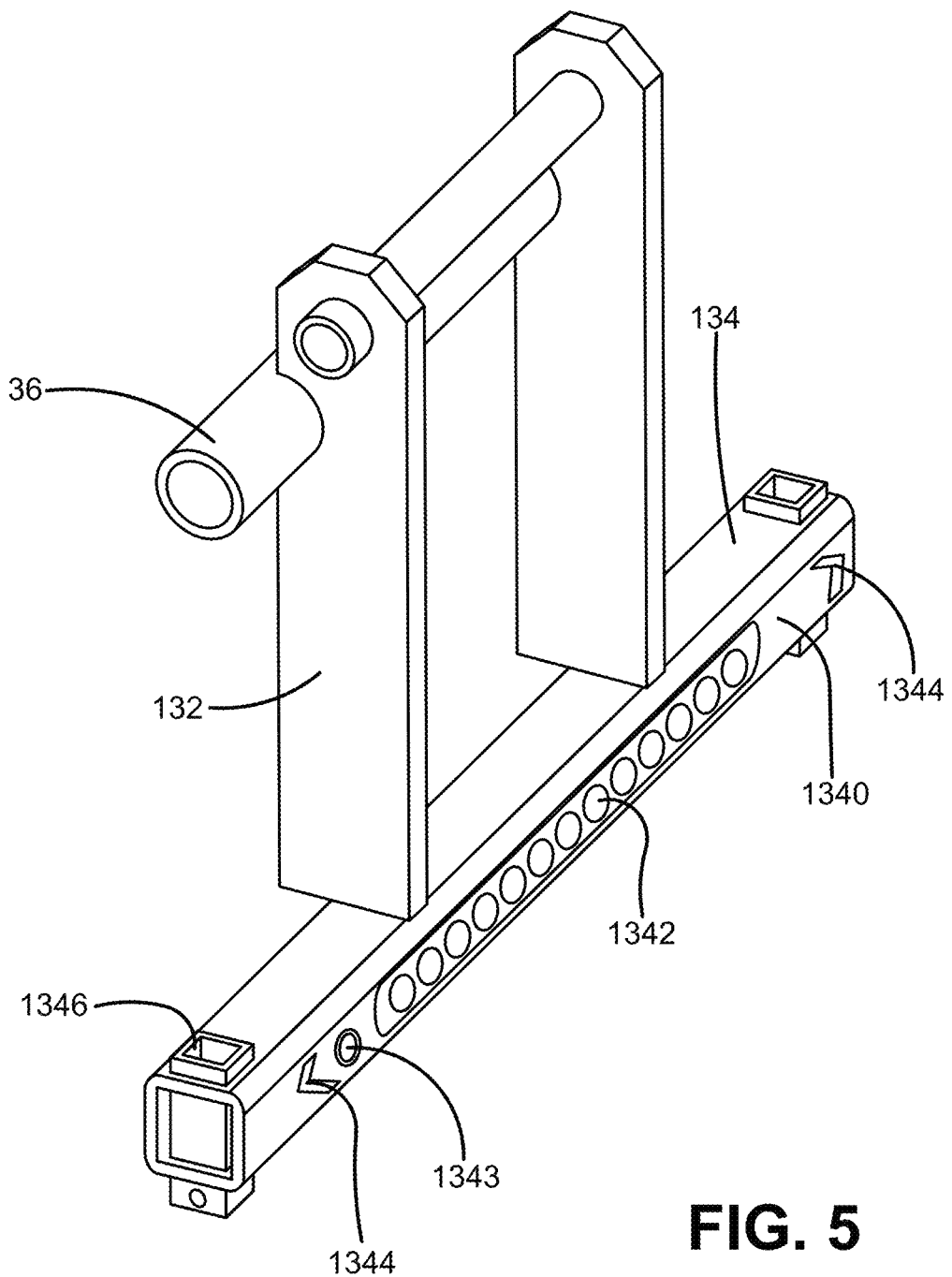
FIG. 5 illustrates a perspective view of an alternative embodiment of the rear bumper assembly of the 5th wheel towing attachment of the present invention with brake lights and turn signals in accordance with the disclosed architecture.

As best shown in FIGS. 1, 2, and 5 the towing attachment device 100 may further be comprised of a rear bumper assembly 130. The rear bumper assembly 130 is, in turn, comprised of a pair of vertical support arms 132 and at least one horizontal cross member 134. In differing embodiments, the front surface 1340 of the at least one horizontal cross member 134 can be comprised of a series of reflective signals/indicators 1343, functional brake lights 1344 that are in electrical communication with the braking system of the semi-truck, and/or functional turn signals 1344 that are in electrical communication with the brake light system of the first semi-truck. The bumper assembly 130 is preferably attached to the second end 120 of the central frame arm 140 via a locking pivot pin 136. Accordingly, the locking pivot pin 136 allows the rear bumper assembly 130 to pivot upwards in the event of a rear end collision with the towing attachment device 100 when it is not attached to a second semi-truck 20, thereby mitigating the potential of impacting the windshield of a vehicle that strikes the towing device 100 from the rear. The pivot pin 136 also allows the bumper 130 to be locked in a plurality of orientations/positions to prevent it from interfering with the attachment of the towing attachment device 100 to the second semi-truck 20, as best shown in FIG. 6B.

Figure 4:
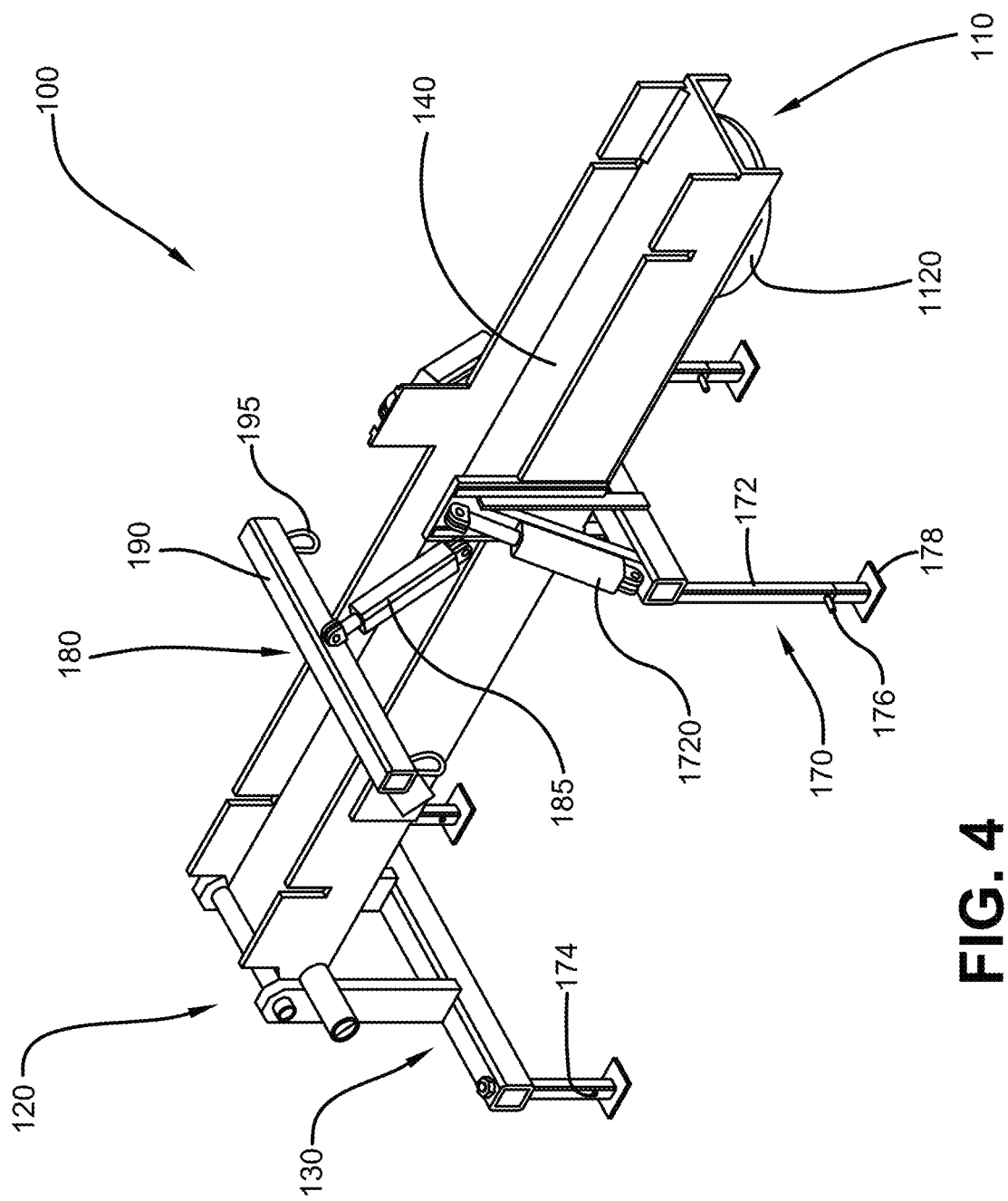
FIG. 4 illustrates a perspective view of an alternative embodiment of the 5th wheel towing attachment of the present invention in accordance with the disclosed architecture, wherein the storage legs are in a deployed position.

FIG. 4 illustrates a perspective view of an alternative embodiment of the 5th wheel towing attachment 100 of the present invention in accordance with the disclosed architecture, wherein removable storage legs 170 are in a fully deployed position. More specifically, in this particular embodiment, the towing attachment device 100 has a plurality of removable legs 170 that attach to the saddle assembly 150 and rear bumper assembly 130. The removable legs 170 have a central vertical frame 172 which may be comprised of a plurality of continuous openings 174 which allow a pin 176 to engage the opening 174 to set the leg 170 at a specific height to allow the device 100 to remain free-standing when not in use via a plurality of feet 178. Therefore, the attachment 100 can be easily attached to a semi-truck without the need for additional users or significant effort. In a differing embodiment of the device 100, the legs 170 may be connected to the air brake/braking system of the semi-truck, which allows the legs 170 to be raised/lowered via a hydraulic assembly 1720 that can be controlled within the cab of the semi-truck or via an external control 171 on some portion of the attachment 100 such as the motor housing 1160.

In order to attach the device 100 to a semi-truck from its stowed position, a user must simply back the semi-truck up to the device 100, and then attach the device 100 based on the procedures outlined supra. Additionally, this embodiment of the device 100 may further comprise a towing chain support/secondary support 180 as noted above. The support 180 is capable of articulating between 0 and 180 degrees via a plurality of hydraulic arms 185 that may be powered via the electric motor 116 system, or by the existing air brakes/airline of the semi-truck 10. The support 180 is further comprised of a cross member 190 that has a pair of chain attachment loops 195. Said loops 195 allow a user to secure the towing chains 198 that would be attached to the second semi-truck 20 to the device 100, thereby ensuring said chains 198 cannot become dislodged/disconnected from the first semi-truck 10 during the towing/transport procedure. The support member 180 is also capable of articulating in the manner described above to allow the user to create/release tension in the towing chains, and also to aid the saddle assembly 150 in lifting the second semi-truck 20 off of the ground, as best seen in FIG. 6B.

Notwithstanding the forgoing, the 5th wheel towing attachment 100 of the present invention and its various components can be of any suitable size and configuration as is known in the art without affecting the overall concept of the invention, provided that they accomplish the above-stated objectives. One of ordinary skill in the art will appreciate that the size, configuration and material of the 5th wheel towing attachment 100 as shown in the FIGS. are for illustrative purposes only, and that many other sizes and shapes of the 5th wheel towing attachment 100 are well within the scope of the present disclosure. Although the dimensions of the 5th wheel towing attachment 100 are important design parameters for user convenience, the 5th wheel towing attachment 100 may be of any size, shape and/or configuration that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A 5th wheel towing attachment comprising:
   a central frame arm;
   a pair of male 5th wheel attachments;
   a toolbox;
   a saddle assembly that is further comprised of a plurality of hydraulic arms and a base that can be raised or lowered via the plurality of hydraulic arms on a frame of a semi-truck;
   a motor and a protective motor housing;
   a plurality of detachable legs;
   a rear bumper assembly; and
   a towing support that is comprised of a plurality of chain attachment loops.

2. The 5th wheel towing attachment of claim 1, wherein the rear bumper assembly is comprised of a plurality of turn signals that are in electrical communication with the semi-truck.

3. The 5th wheel towing attachment of claim 1, wherein the rear bumper assembly is comprised of a plurality of brake lights that are in electrical communication with the semi-truck.

4. The 5th wheel towing attachment of claim 1, wherein the rear bumper assembly is comprised of at least one reflective signal.

5. The 5th wheel towing attachment of claim 1, wherein the saddle assembly is repositionable along the central frame arm via a plurality of rollers.

6. The 5th wheel towing attachment of claim 1, wherein the saddle assembly is repositionable along the central frame arm via a hydraulic arm system.

7. The 5th wheel towing attachment of claim 1, wherein the base of the saddle assembly is comprised of a plurality of channels that engage the frame of the semi-truck.

8. The 5th wheel towing attachment of claim 1, wherein the toolbox is enclosed and can be opened via a locking mechanism located within a cabin of the semi-truck.

9. The 5th wheel towing attachment of claim 1, wherein the 5th wheel towing attachment is removably attached to the semi-truck and a second semi-truck.

10. The 5th wheel towing attachment of claim 1, wherein the plurality of detachable legs are repositionable between a stowed position and a deployed position.

11. The 5th wheel towing attachment of claim 1, wherein the plurality of detachable legs can be raised or lowered by placing a pin through one of a plurality of continuous openings in the plurality of detachable legs.

12. The 5th wheel towing attachment of claim 1 further comprising a first end and a second end, wherein the pair of male 5th wheel attachments are located on a bottom surface of the first end and the second end.

* * * * *